C. A. HART.
AUTOMOBILE JACK.
APPLICATION FILED APR. 14, 1913.
1,080,442.
Patented Dec. 2, 1913.
2 SHEETS—SHEET 1.
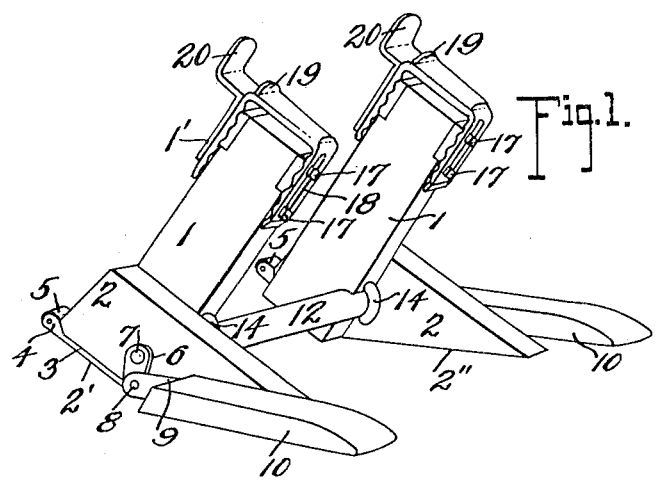
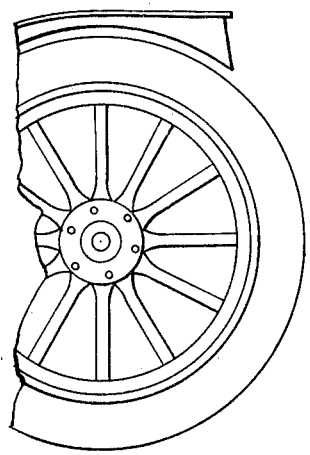
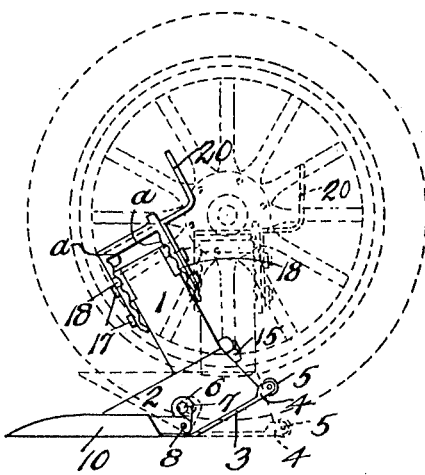
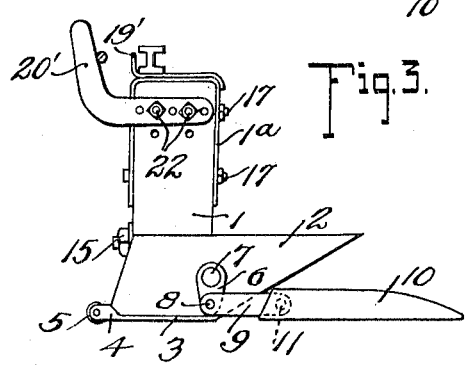
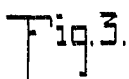
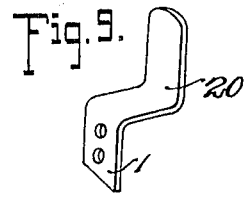
Inventor
Charles A. Hart
Witnesses
C. H. Wagner
G. W. Kirkley
By Robert Robb
Attorneys.

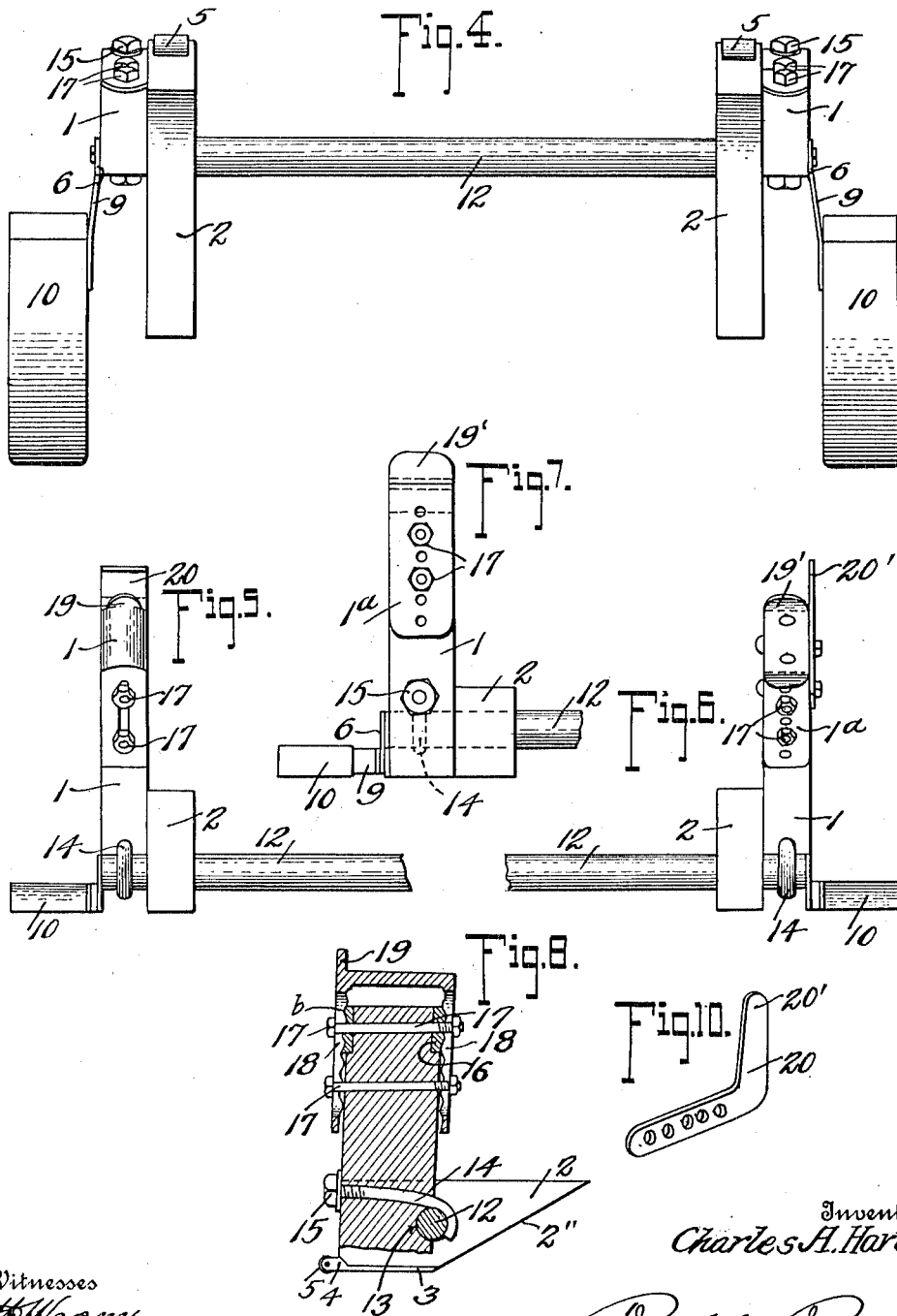

UNITED STATES PATENT OFFICE.

CHARLES A. HART, OF FINDLAY, OHIO.

AUTOMOBILE-JACK.

1,080,442.

Specification of Letters Patent.

Patented Dec. 2, 1913.

Original application filed April 5, 1912, Serial No. 688,659. Divided and this application filed April 14, 1913. Serial No. 761,045.

*To all whom it may concern:*

Be it known that I, CHARLES A. HART, a citizen of the United States, residing at Findlay, in the county of Hancock and State of Ohio, have invented certain new and useful Improvements in Automobile-Jacks, of which the following is a specification.

The present invention appertains to the class of lifting jacks adapted for automatic operation by a vehicle approaching and engaging the same to lift the latter. Jacks of this type are especially advantageous for use in connection with automobiles for removing the weight of the machine from the tires of the wheels when the automobile is to remain stationary for any length of time, damage to the tires being thus avoided.

The improvements hereinafter set forth involve particularly the peculiar construction of lifting standards which form a part of rocking members that operate automatically in the manner above premised.

The present application is a division of my previous application, Serial Number 688,659, filed April 5, 1912.

Some motor vehicles are so designed that the steering rod or drag-bar is located in front of the axle and in the use of my previous jack constructions, said rod prevents operation of the jack, as contemplated, namely by engagement of the front axle with the standards direct. I therefore provide as a part of the present improvements, brackets or members at the upper ends of the lifting standards adapted to be engaged by the steering rod of machines of the last mentioned type, whereby the tilting of the jack in raising the vehicle is caused primarily by coöperation of the steering rod with said brackets or members instead of by coöperation of the axle directly with the standards.

For a full understanding of the present invention, reference is to be had to the following description and to the accompanying drawings, in which—

Figure 1 is a perspective view of a jack embodying the essential features of the present improvements. Fig. 2 is a side view of the jack, full lines showing the same in position ready to receive thereon the axle of a motor vehicle, and dotted lines showing the position assumed by the parts after elevation of the portion of the vehicle with which the jack coöperates. Fig. 3 is a side elevation showing a modified form of adjustable standard, and a modified construction of bracket member to be engaged by the steering rod. Fig. 4 is a top plan view of the preferred embodiment of the invention but showing the adjustment of the standards obtained by reversing the same upon the cross-piece or rod. Fig. 5 is a front view partly broken away of one of the standards and associated parts. Fig. 6 is a view similar to Fig. 5, showing the modification of Fig. 3. Fig. 7 is a view of the parts shown in Fig. 5, looking toward the rear. Fig. 8 is a vertical sectional view of the standard of preferred construction, the fulcrum member being broken away. Fig. 9 and 10 are perspective views of the preferred and modified forms, respectively of tilting bracket members.

Throughout the following detail description and on the several figures of the drawings, similar parts are referred to by like reference characters.

Describing the invention specifically, in the drawings, 1 denotes the lifting standards and 2 the base or fulcrum members of said standards. The members 2 are secured in any rigid or substantial manner to the standards 1 at one side of the latter, and each member 2 is formed on its bottom portion with a bearing surface 2' adapted to support its standards when in an upright or vertical position and an auxiliary inclined bearing surface 2" adapted to support said standard in a position slightly inclined or tilted with respect to a vertical plane, as shown in Fig. 1 of the drawings.

Applied to each base or fulcrum member 2 and secured to its surface 2' is a plate 3 provided with ears 4 at its rear end and in which ears is journaled a roller 5, the latter being, of course, located at the rear extremity of the adjacent member 2. Adjacent to the fulcrum portion, or the angle at which the surfaces 2' and 2" of each member 2 meet, is a link 6 pivoted at 7 at its upper end to the member 2, the lower end of said link being pivotally connected at 8 with a second link 9. The last mentioned link 9 is in turn pivoted at its front end to a runner 10, as shown at 11. It will be understood that the runner 10 is associated with each of the fulcrum members 2, as in my previous constructions of jack, and the parts 6 and 9 constitute a connection between the associated runner and fulcrum member.

The standards and fulcrum members above referred to are arranged in pairs and each pair is adjustable toward and from the other pair by the provision of a cross-bar or rod 12 which passes at opposite ends through openings in the fulcrum members 2 and is seated in recesses 13 in the front sides of the standards 1. Adjustable tension members in the form of hooks 14, having the nuts 15, pass approximately horizontally through the standards 1 and are arranged so that the hooks thereof engage the cross-bar 12 so as to rigidly connect the parts 1 and 2 therewith, but in such a manner as to permit adjustment of each pair of standard and fulcrum members toward and from one another by merely loosening the connections 14 and obtaining the desired adjustment.

As shown in Fig. 1, the standards 1 are at their maximum adjustment from one another, so far as longitudinal movement of the bar 12 is concerned. Since the standards 1 are on the inner sides of the fulcrum members, however, an increase of space between said standards may be obtained readily by entirely detaching the members 1 and 2 from the bar 12, and reversing the same thereon to assume the positions shown in Fig. 4, as distinguished from the positions shown in Fig. 1. The reversal aforesaid will result in a disposition of the standards 1 at the outer sides of their fulcrum members, which is their maximum adjustment apart.

The pivots 7 forming a part of the link connections between the runners and fulcrum members preferably comprise detachable fastenings or screws engaging the ends of the cross-bar 12 and when the standards 1 are reversed, as shown in Fig. 4, a reversal of the runners 10 from one end of the cross-bar 12 to the other, is necessary, and effected merely by detaching the fastening pivots 7. As a matter of fact, the pivots 7 have to be detached from the bar 12 before the reversal of the standards 1 and members 2 can be effected. The standards 1 are adjustable as they each comprise a body or lower section and the upper adjustable section 1′, the latter being preferably of U-form in side elevation and having its sides toothed on their inner faces, as shown at $a$. The teeth $a$ are adapted to engage with corresponding teeth $b$ of plates 16 attached to the front and rear portions of each standard. Horizontal fastening bolts 17 pass through the body section of the standards 1 and through slots 18 in the adjustable sections to hold said parts at a proper adjustment. In effecting the relative adjustment of the sections of each standard, the adjustable section 1′ is displaced from the body section by lateral movement disengaging the teeth $a$ and $b$ and other teeth $a$ are engaged with the teeth $b$ of the plate 16 so as to secure the adjustable section 1′ at a lower or higher adjustment than previously had.

In Fig. 3 is illustrated a modified form of adjustable section 1ª for the standard 1, said section 1ª consisting of a U-shaped member, the sides of which have a plurality of apertures, through which the bolts 17 may pass to adjustably connect the adjustable section with the body section.

In the case of both the preferred and modified forms of the adjustable sections 1′ and 1ª, a stop or projection 19 and 19′ respectively, is employed and arranged to extend upwardly from the section for engagement with the axle of a vehicle to initially tilt the jack in the raising operation.

Where the automobile has a steering rod in front of its axle, it is contemplated to adjust the sections 1′ or 1ª, as the case may be, so that the projections 19 and 19′ respectively are below the plane in which the steering rod moves, whereupon said rod will pass over the adjustable sections of the standards and engage auxiliary stop brackets 20 which are detachably and adjustably applied to the rear sides of the standards. When the steering rod engages the stops or stop brackets 20, as shown in Fig. 1, an upward tilting movement will be imparted to the standards only after the front axle of the vehicle is above said standards so that the lifting operation performed by the jack will elevate the axle and its wheels and no likelihood of bending or damaging the steering rod is incurred.

In the practical use of the invention, the parts are, of course, arranged as in Fig. 1 and the automobile is driven forwardly until the front wheels pass on to the runners 10. In the movement of the vehicle, the front axle will engage the stops 19 and impart an upward movement to the standards 1 until they assume vertical positions, the fulcrum members 2 being tilted also in the above operation so as to obtain the necessary elevation required to raise the axle until the weight of the front portion of the vehicle is supported by the jack and not by the tires of the wheels. As the jack is tilted in the above manner, the runners 10 remain stationary, the links 6 and 9 affording a floating or flexible connection, permitting such action. If there be any tendency on the part of the vehicle to pass over the jack after the standards 1 assume vertical positions, such tendency will only exert a pushing movement upon the jack causing the same to skid slightly on the rollers 5 in the direction of movement of the vehicle.

As shown in Fig. 2, when the fulcrum member tilts to its horizontal position, the tendency of the links 6 and 9 is to assume a position in alinement, though full alinement is not obtained.

As shown in Figs. 3, 6 and 10, a modified form of the auxiliary stop or bracket 20 is employed and designated 20'. It consists merely of a curved bar adjustable longitudinally and vertically by fastenings 22, upon a side of each standard 1.

It will be understood, of course, that the jack, as described herein, after operation to elevate one end of a vehicle, may be associated with other jacks or jack means for raising the opposite end of said vehicle, and further the invention is susceptible for use with any type of vehicle irrespective of whether it is motor propelled or not. Furthermore, slight changes in the detail construction of the invention are contemplated by the foregoing description and scope of the claims hereto appended.

Having thus described the invention, what I claim as new is:

1. An automatic jack of the class described comprising rocking standards adapted to automatically coöperate to raise a vehicle as the latter is moved into engagement therewith, said standards comprising adjustable sections, stops carried by said standards at their upper ends, and auxiliary stops associated with the first mentioned stops.

2. An automatic jack of the class described comprising rocking standards adapted to automatically coöperate to raise a vehicle as the latter is moved into engagement therewith, said standards comprising adjustable sections, stops carried by said standards at their upper ends, auxiliary stops associated with the first mentioned stops, and fastening means for securing the sections of the standards and auxiliary stops at various adjustments.

In testimony whereof I affix my signature in presence of two witnesses.

CHARLES A. HART.

Witnesses:
 WM. MEYER,
 C. A. STOCKTON.

---

Copies of this patent may be obtained for five cents each, by addressing the "Commissioner of Patents, Washington, D. C."